Aug. 10, 1926.
R. E. KERR
GOLF BALL MOLD
Filed August 25, 1924
1,595,409
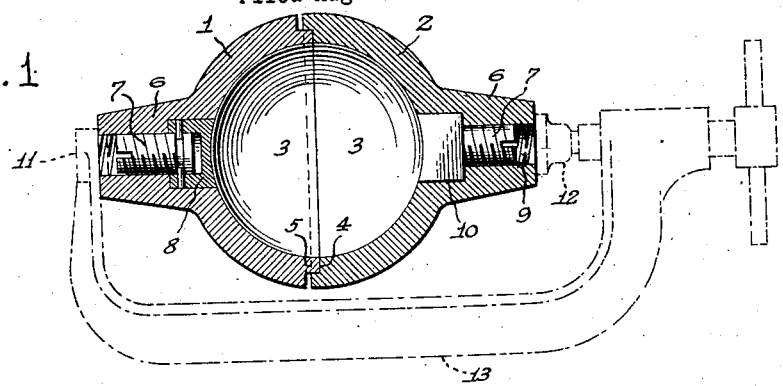
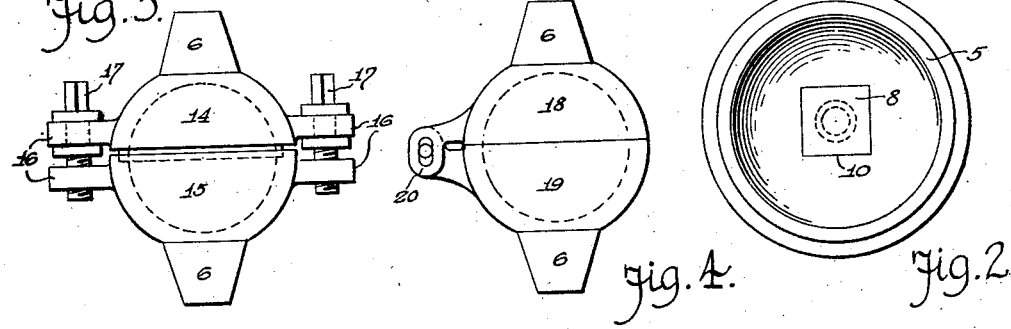
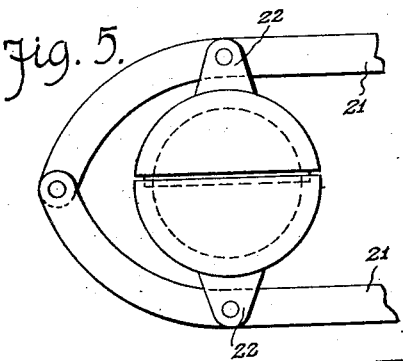 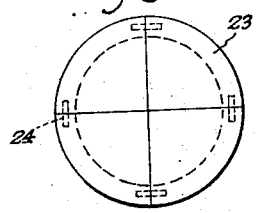 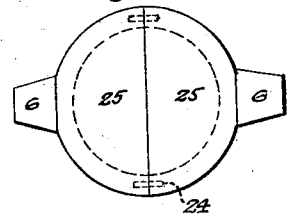
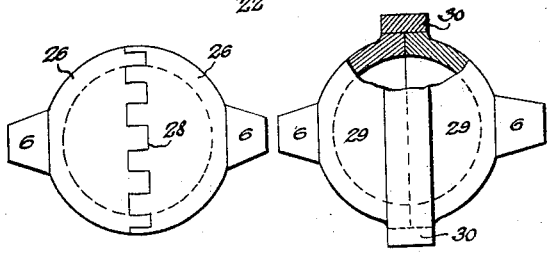 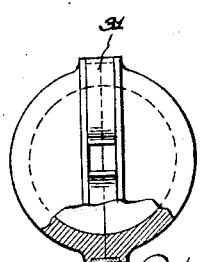
Inventor
Robert E. Kerr,
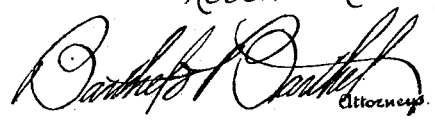
Attorneys Patented Aug. 10, 1926.

1,595,409

UNITED STATES PATENT OFFICE.

ROBERT E. KERR, OF DETROIT, MICHIGAN, ASSIGNOR OF FORTY PER CENT TO CLARENCE A. NOTMAN, OF DETROIT, MICHIGAN.

GOLF-BALL MOLD.

Application filed August 25, 1924. Serial No. 733,923.

This invention relates to a golf ball mold and a method of renewing balls which have been dented, torn or otherwise disfigured or injured to such an extent that the disfiguration interfered with the flight of a ball and driving it in a desired manner. A great many golf balls have heretofore been discarded on account of certain imperfections and I now aim to reclaim such balls and repair the same so that they are practically new and may be again used. To do this, I provide a simple, inexpensive and durable mold in which a disfigured ball and additional rubber or material from which the ball was made are placed in the mold and the ball and additional material subjected to heat and pressure whereby the ball is re-shaped and made practically new. The mold or device by which I accomplish such result includes two or more sections providing an inner spherical wall and the outer wall formed by the mold sections may be of any contour, but preferably that which will afford thin walls so that the interior of the mold and the ball therein may be heated by conduction. Provision is made for ejecting a repaired ball from a section of the mold and various kinds of devices may be employed for subjecting the mold to pressure.

My invention, besides including a molding device, includes a method of repairing injured golf balls. For instance, an injured ball is placed in a mold, cured rubber or a quantity of material corresponding to that from which the ball is made is applied to the injured part of the ball, the mold closed under pressure and subjected to heat so that a preferred shape may be imparted thereto.

My invention will be hereinafter specifically described and then claimed, and reference will now be had to the drawing, wherein Figure 1 is a longitudinal sectional view of one form of molding device, showing by dot and dash lines a clamp or means by which the contents of the molding device may be subjected to pressure;

Fig. 2 is an end view of one of the parts or sections of the mold, and

Figs. 3 to 10 inclusive show various forms of molds that may be used to put my invention into practice.

Reference will first be had to Figs. 1 and 2 showing substantially semi-spherical mold parts or sections 1 and 2 which provides semi-spherical mold cavities or recesses 3 affording a spherical wall adapted to impart a spherical shape to a ball or material squeezed or compressed by the mold sections.

The mold section 2 has an annular seat 4 for an annular flange 5 of the mold section 1 and the joint between said mold sections precludes flashing or the formation of any fin, web or protuberance circumferentially of a molded ball.

Each of the mold sections is formed with an enlargement 6 and each enlargement is provided with an ejector preferably in the form of a screw 7 having a swiveled connection with a head 8. The screw is adjustable in a longitudinal opening 9 having its wall screwthreaded and the head 8 is normally housed in a recess 10 with the outer wall of the head concave as a continuation of the wall of the mold section in which it is located. Should a ball adhere to either mold section, after the mold sections are separated, the ejector of the mold section to which the ball adheres may be operated to separate the ball and mold section.

The enlargements 6 of the mold sections 1 and 2 serve as diametrically opposed abutments for the end members 11 and 12 of an ordinary C clamp 13, and by adjusting the end member 12 with the mold sections 1 and 2 interposed between the end members of the clamp, the contents of the mold sections may be subjected to pressure.

The mold and clamp shown in Fig. 1 are samples of others that may be readily used. For instance, in Fig. 3, the mold sections 14 and 15 may have sets of apertured ears 16 connected by screw bolts 17 and by adjusting said screw bolts the mold sections may be drawn together.

In Fig. 4 the mold sections 18 and 19 are loosely or hingedly connected together, as at 20, so that said mold sections will at all times be in proximity to each other and will properly aline without any spherical joint or connection.

Instead of using the clamp 13 or screw bolt 17 for bringing pressure to bear on the mold sections, pivotally connected levers 21 may be employed, as shown in Fig. 5, said levers being pivotally connected to apertured lugs 22 of the mold sections. This view indicates that the ball ejectors may be dispensed with.

A mold may be composed of a plurality of sections 23 connected by dowel pins 24 or the like, as shown in Fig. 6, and such dowel pins may be also employed for connecting the sections 25 of the two-piece mold shown in Fig. 7. Instead of dowel pins mold sections 26 may have tongue and groove connections, as indicated at 28 and shown in Fig. 8, then again, mold sections 29 may be surrounded by a collar 30 or a resilient band 31, such being shown in Figs. 9 and 10.

In practice, I take a disfigured golf ball and place on the injured part thereof enough material to repair the ball. This may be done before or after the ball is placed in the mold and the additional material is preferably the same material from which the ball is made. After applying material to the ball, the mold is closed and subjected to pressure and heat so that the ball will be reshaped and made practically new. Heating of the mold may be conveniently accomplished by immersion in boiling water, and as the ball expands and becomes soft the additional material becomes part thereof, so that on cooling and contraction the ball assumes proper shape.

The above is a brief outline of my invention in its simplest form and it is to be noted that there are many ramifications of my invention, among which may be mentioned the following.

Instead of placing the mold in boiling water, the ball may be softened and expanded by heat applied in various ways, for instance parboiling before being placed in the mold, and it may be found that certain liquids will clean and place the ball in better condition for molding purposes than water.

Besides repairing the spot on the ball that needs repair, I may recoat or provide the ball with a new outer surface, in which instance additional material would be placed over the entire surface of the ball.

Instead of there being a single mold it is obvious that gang or multiple molds may be provided, for club use, so that a large number of golf balls may be repaired at one time, in contradistinction to the single individual mold herein described.

With some golf balls it may be possible to repair the same without resorting to heat particularly where a material can be subjected to pressure and permitted to harden on a ball. It is also apparent that various kinds of means may be employed for vulcanizing, baking or otherwise setting a ball while held, in shape.

While in the drawings there are illustrated different forms of molds that I may employ, yet I would have it understood that the molding devices, as well as the method involved are susceptible to such changes as are permissible by the appended claim.

What I claim is:—

A mold for shaping a golf ball, comprising mold sections between which a ball is placed, an outwardly protruding enlargement on the central portion of each mold section, a screw in each enlargement, a non-rotatable ejector head on each screw, and means engaging the enlargements of the mold sections to facilitate bringing pressure to bear on said mold sections.

In testimony whereof I affix my signature.

ROBERT E. KERR.